(12) United States Patent
Blanchard et al.

(10) Patent No.: US 6,782,102 B2
(45) Date of Patent: Aug. 24, 2004

(54) MULTIPLE FORMAT SECURE VOICE APPARATUS FOR COMMUNICATION HANDSETS

(75) Inventors: Scott D. Blanchard, Mesa, AZ (US); Dean P. Vanden Heuvel, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 803 days.

(21) Appl. No.: 09/746,385

(22) Filed: Dec. 21, 2000

(65) Prior Publication Data

US 2002/0080966 A1 Jun. 27, 2002

(51) Int. Cl.[7] .......................... H04N 7/14; H04N 7/167
(52) U.S. Cl. .................... 380/270; 713/153; 348/14.01; 380/271; 380/250
(58) Field of Search .......................... 713/153; 380/270, 380/271, 250, 247, 52, 29, 28; 348/14.01; 705/1

(56) References Cited

U.S. PATENT DOCUMENTS

| | | | |
|---|---|---|---|
| 4,815,128 A | 3/1989 | Malek | 380/9 |
| 4,914,697 A | 4/1990 | Dabbish et al. | 380/28 |
| 5,222,137 A | 6/1993 | Barrett et al. | 380/21 |
| 5,305,384 A | 4/1994 | Ashby et al. | |
| 5,509,075 A | 4/1996 | Grube et al. | 380/23 |
| 5,517,568 A | 5/1996 | Grube et al. | 380/23 |
| 5,584,047 A | 12/1996 | Tuck | 455/13.1 |
| 5,592,555 A | 1/1997 | Stewart | 380/49 |
| 5,787,180 A | 7/1998 | Hall et al. | |
| 6,424,947 B1 * | 7/2002 | Tsuria et al. | 705/1 |
| 6,549,229 B1 * | 4/2003 | Kirby et al. | 348/14.01 |

FOREIGN PATENT DOCUMENTS

| | | |
|---|---|---|
| EP | 0 680 171 A | 11/1995 |
| WO | WO 00 25467 A | 5/2000 |

* cited by examiner

*Primary Examiner*—Ly V. Hua
(74) *Attorney, Agent, or Firm*—Frank J. Bogacz

(57) ABSTRACT

Multiple format secure voice apparatus for communication handsets includes a core unit with a speaker, a microphone, a keypad, and a display. The core unit also includes an audio circuit coupled to the speaker and the microphone, an encryption/decryption element coupled to the audio circuit, a coder/decoder element coupled to the audio circuit and the encryption/decryption element, and a control element coupled to the keypad, the display, the audio circuit, the encryption/decryption element, and the coder/decoder element. A standard interface coupling is connected to an audio I/O terminal, a data I/O terminal of the coder/decoder element, and a control I/O terminal of the control element. A mating standard interface coupling mates with the standard interface coupling of the core unit and is coupled to the mating standard interface coupling.

20 Claims, 1 Drawing Sheet

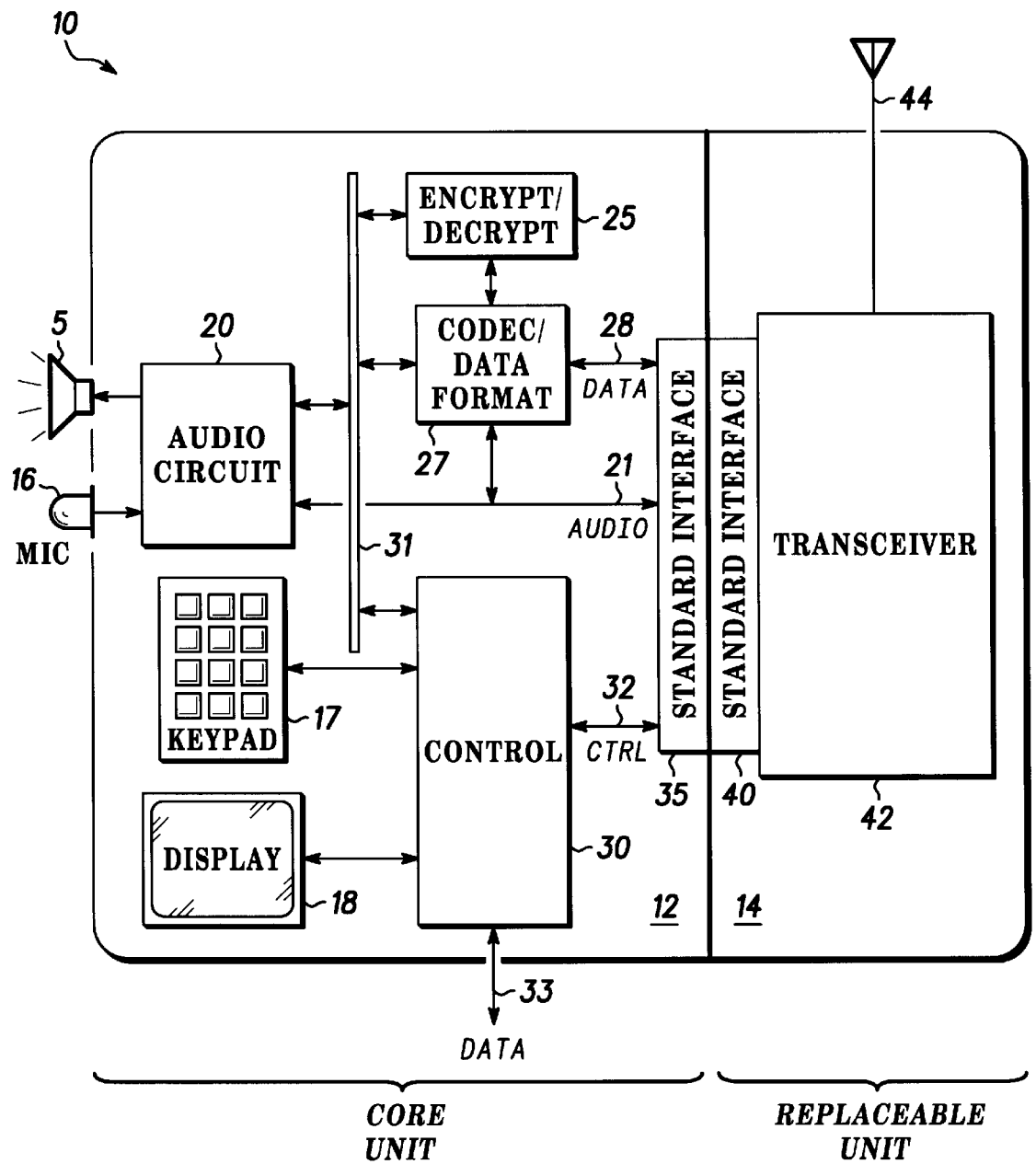

tion of the information by outside parties. A problem arises because of the large number of different devices. Examples of some different wireless devices are AMPS, GSM (a European TDMA cellular phone), Iridium, IS95 (CDMA), Tetra (a European terrestrial trunked radio), and an example of a wired device is V.34 MODEM.

MULTIPLE FORMAT SECURE VOICE APPARATUS FOR COMMUNICATION HANDSETS

FIELD OF THE INVENTION

This invention relates to communication handsets and more specifically to secure or encrypted handsets.

BACKGROUND OF THE INVENTION

At the present time, there is a large number of different hand-held communication devices, such as remote telephones, cellular telephones, two-way radios, etc. In many instances it is desirable to provide secure or encrypted communications to prevent interception of the information by outside parties. A problem arises because of the large number of different devices. Examples of some different wireless devices are AMPS, GSM (a European TDMA cellular phone), Iridium, IS95 (CDMA), Tetra (a European terrestrial trunked radio), and an example of a wired device is V.34 MODEM.

Each of these wireless and wired devices has a different front-end and a different operating format for the transceiver portion. In order for one manufacturer to produce secure or encryption devices for all of these different communication devices, it is presently necessary to produce a different module for each different device because the module must be compatible with the different front-ends and the different operating formats. Thus, one manufacturer must produce literally dozens of different products to match the dozens of different devices that may require a secure or encryption module. Clearly, this is impractical since the manufacturer may only sell a few of any one module in his particular area. Further, each time that a customer changes the handheld communication device that he is using (e.g., buys a different model of telephone) or purchases a second type of handheld communication device, he must buy a new or another encryption module. This becomes extremely expensive and can severely curtail the customer's exchange and purchase of different equipment.

Also, if any of these encryption modules are to be used by the U.S. Government, each of these encryption modules must be separately certified for use on Government applications. The Government certification process is long and expensive so that a manufacturer loses a great amount of time and money if it attempts to certify several different encryption modules.

Accordingly it is highly desirable to provide multiple format secure voice apparatus for communication handsets.

BRIEF DESCRIPTION OF THE DRAWING

Referring to the drawing, the single FIGURE is a simplified block diagram of multiple format secure voice apparatus for communication handsets in accordance with the present invention.

DESCRIPTION OF THE PREFERRED EMBODIMENT

Referring to the single FIGURE, a simplified block diagram is illustrated of multiple format secure voice apparatus and communication handset 10 in accordance with the present invention. Handset 10 includes a core unit 12 and a replaceable unit 14. Core unit 12 includes a complete front end with any desired operator interface elements, such as a speaker 15, a microphone 16, a keypad 17, one or more displays 18, etc. Speaker 16 and microphone 17 are connected to an audio circuit 20, which in a preferred embodiment converts the analog audio signals to digital signals. Examples of digital output audio circuits include A-Law PCM (Pulse Code Modulation) CODECs and µ-Law PCM CODECs that convert audio to 8-bit samples at 8 kHz. Audio circuit 20 provides the digital audio signal on an input/output (I/O) terminal 21.

Core unit 12 further includes an encryption/decryption element 25 which may incorporate any of the well known encryption algorithms. Generally, for commercial handsets element 25 will include a commercial standard encryption algorithm, such as DES or Triple DES. In handsets certified for use on Government applications the encryption algorithm will be, for example, U.S. Govt. Type 1 or UK "High-grade". As will be understood by those skilled in the art, certification for U.S. Government use is much more difficult and expensive than whatever certification is required for commercial sales. However, as will be understood from the description below, only one certification is required for the single or common core unit 12 so that the certification time and expense is greatly reduced.

Core unit 12 further includes an encode/decode element 27 which converts the digital audio signals from audio circuit 20 into an easily transmitted format. Typical examples of element 27 are a vocoder ACELP, VCELP, AMBE, or IMBE. All of these encode/decode algorithms convert the voice or data from a 64 kbit digital signal into a lower rate signal (2.4 kBPS to 9.6 kBPS, typically). Also, element 27 operates in conjunction with element 25 to encrypt signals to be transmitted and to decrypt received signals. Coded and encrypted signals are present on I/O terminal 28. Also, in some instances it may be desirable to provide audio directly without encryption and with or without coding. This audio is provided on I/O terminal 21.

A control element 30 is coupled by means of a bus 31 to audio circuit 20, encryption/decryption element 25 and encode/decode element 27. As will be understood, control element 30 provides all of the necessary control signals to control the operation of core unit 12. Also, keypad 17 is connected to control element 30 to receive any instructions from various controls (e.g., on/off, etc.) and to convert typed messages into digital signals compatible with element 27. Display 18 is connected to control element 30 and receives signals compatible with the display from control element 30. Also in some instances (e.g., touch screens and the like) control element 30 may receive signals from display 18. It will of course be understood that some, all, or additional operator interface elements may be incorporated in core unit 12 and will generally be connected in a manner known in the art. Control element 30 also has an I/O terminal 32 for receiving and communicating various control signals. Also, control element 30 can have a data I/O terminal 33 for connecting core unit 12 directly to various wired devices in an office, home, etc.

Here it should be understood that core unit 12 is designed as a common front end for any or all hand-held communication handsets or devices, including but not limited to well known wireless devices such as AMPS, GSM (a European TDMA cellular phone), Iridium, IS95 (CDMA), Tetra (a European terrestrial trunked radio), and well known wired devices, such as V.34 MODEMs. To accommodate core unit 12 to the various hand-held communication devices, a standard interface coupler 35 is provided. Standard interface coupler 35 is connected to data I/O terminal 28, Audio I/O terminal 21. and control I/O terminal 32.

A mating standard interface coupler 40 is incorporated into any hand-held communication handsets or devices intended to utilize core unit 12 as the front end. For after market use, i.e., handheld units already in use and incorporating their own internal front ends, mating standard interface coupler 40 can be easily incorporated so that core unit 30 can be coupled and used instead of the internal front end. Here the term "standard interface coupler" is defined as any well known coupler which can be conveniently installed in core unit 30 and in any handheld communication handsets or devices intended to utilize core unit 12 as the front end. Mating standard interface coupler 40 is connected in a well known manner to a transceiver 42 which is formatted for any of the various wireless and/or wired systems. An I/O terminal 44 is illustrated with an antenna 45 attached thereto but it will be understood that terminal 44 could be or could include a connection to various wired systems.

Thus, handheld units for all of the various communications systems (e.g., wireless devices such as AMPS, GSM (a European TDMA cellular phone), Iridium, IS95 (CDMA), Tetra (a European terrestrial trunked radio), and well known wired devices, such as V.34 MODEMs) simply require a transceiver compatible with the various formats and a mating standard interface coupler. Individual front ends can be eliminated. A common core unit 12 is then supplied for each handheld unit or, in cases where an individual desires different handheld units, a single core unit 12 can be used with any of the handheld transceiver units. Also, when an individual wants a new or different communications device he simply purchases a new handheld transceiver unit and uses the old common core unit. Further, in instances where an individual already has a handheld unit with an internal front end, he can simply install the mating standard coupler 40 and use the common core unit for secure communications. This greatly simplifies manufacturing of new handheld transceiver units and substantially reduces the cost to consumers. Therefore, each time that a customer changes to a handheld communication device with a different format or purchases a new or a second type of handheld communication device, he is not required to purchase a new or another encryption module. Because the manufacturer is only required to certify and or test a single front end, the time is substantially reduced and the cost to the consumer is reduced.

While we have shown and described a specific embodiment of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. Multiple format secure voice apparatus for communication handsets comprising:
   a front end including operator interface elements, an audio circuit coupled to at least one of the operator interface elements and having an audio I/O terminal, an encryption/decryption element coupled to the audio circuit, a coder/decoder element coupled to the audio circuit and the encryption/decryption element, the coder/decoder element having a data I/O terminal, and a control element coupled to at least one operator interface element, the audio circuit, the encryption/decryption element, and the coder/decoder element and having a control I/O terminal; and
   a standard interface coupling connected to the audio I/O terminal, the data I/O terminal, and the control I/O terminal, the standard interface coupling being designed to mate with a standard interface coupling on a handheld communication device to operatively couple the front end to a transceiver of the handheld communication device.

2. Multiple format secure voice apparatus for communication handsets as claimed in claim 1 wherein the operator interface elements of the front end include at least one of a speaker, a microphone, a keypad, and a display.

3. Multiple format secure voice apparatus for communication handsets as claimed in claim 1 wherein the coder/decoder element includes one of a vocoder ACELP, VCELP, AMBE, and IMBE.

4. Multiple format secure voice apparatus for communication handsets as claimed in claim 1 wherein the audio circuit includes one of an A-LAW PCM CODEC and a $\mu$-LAW PCM CODEC.

5. Multiple format secure voice apparatus for communication handsets as claimed in claim 1 wherein the coder/decoder element also has a data input terminal for receiving data from an external wired source.

6. Multiple format secure voice apparatus and communication handset comprising:
   a core unit comprising: a front end including operator interface elements; an audio circuit coupled to at least one of the operator interface elements and having an audio I/O terminal; an encryption/decryption element coupled to the audio circuit; a coder/decoder element coupled to the audio circuit and the encryption/decryption element, the coder/decoder element having a data I/O terminal; a control element coupled to at least one operator interface element, the audio circuit, the encryption/decryption element, and the coder/decoder element and having a control I/O terminal; and a standard interface coupling connected to the audio I/O terminal, the data I/O terminal, and the control I/O terminal; and
   a replaceable unit including a standard interface coupling designed to mate with the standard interface coupling of the core unit and a transceiver coupled to the standard interface coupling of the replaceable unit.

7. Multiple format secure voice apparatus and communication handset as claimed in claim 6 wherein the replaceable unit includes one of a wireless device and a wired device.

8. Multiple format secure voice apparatus and communication handset as claimed in claim 7 wherein the wireless device includes one of a cellular telephone, a remote telephone, a two-way radio, an AMPS, a GSM (a European TDMA cellular phone), an Iridium, an IS95 (CDMA), and a Tetra (a European terrestrial trunked radio), and the wired device includes a V.34 MODEM.

9. Multiple format secure voice apparatus and communication handset as claimed in claim 6 wherein the operator interface elements of the front end include at least one of a speaker, a microphone, a keypad, and a display.

10. Multiple format secure voice apparatus and communication handset as claimed in claim 6 wherein the coder/decoder element includes one of a vocoder, ACELP, VCELP, AMBE, and IMBE.

11. Multiple format secure voice apparatus and communication handset as claimed in claim 6 wherein the audio circuit includes one of an A-LAW PCM CODEC and a $\mu$-LAW PCM CODEC.

12. Multiple format secure voice apparatus and communication handset as claimed in claim 6 wherein the coder/decoder element also has a data input terminal for receiving data from an external wired source.

13. Multiple format secure voice apparatus and communication handset as claimed in claim 6 further including at least two different replaceable units, each including a standard interface coupling designed to mate with the standard interface coupling of the core unit.

14. Multiple format secure voice apparatus and communication handset comprising:
   a core unit comprising:
      operator interface elements including a speaker, a microphone, a keypad, and a display;
      an audio circuit coupled to the speaker and the microphone and having an audio I/O terminal;
      an encryption/decryption element coupled to the audio circuit;
      a coder/decoder element coupled to the audio circuit and the encryption/decryption element, the coder/decoder element having a data I/O terminal;
      a control element coupled to the keypad and the display, the audio circuit, the encryption/decryption element, and the coder/decoder element and having a control I/O terminal;
      a standard interface coupling connected to the audio I/O terminal, the data I/O terminal, and the control I/O terminal;
   a mating standard interface coupling designed to mate with the standard interface coupling of the core unit; and
   a transceiver coupled to the mating standard interface coupling.

15. Multiple format secure voice apparatus and communication handset as claimed in claim 14 wherein the mating standard interface coupling and the transceiver are included in one of a wireless device and a wired device.

16. Multiple format secure voice apparatus and communication handset as claimed in claim 15 wherein the wireless device includes one of a cellular telephone, a remote telephone, a two-way radio, an AMPS, a GSM (a European TDMA cellular phone), an Iridium, an IS95 (CDMA), and a Tetra (a European terrestrial trunked radio), and the wired device includes a V.34 MODEM.

17. Multiple format secure voice apparatus and communication handset as claimed in claim 14 wherein the coder/decoder element includes one of a vocoder ACELP, VCELP, AMBE, and IMBE.

18. Multiple format secure voice apparatus and communication handset as claimed in claim 17 wherein the audio circuit includes one of an A-LAW PCM CODEC and a $\mu$-LAW PCM CODEC.

19. Multiple format secure voice apparatus and communication handset as claimed in claim 17 wherein the coder/decoder element also has a data input terminal for receiving data from an external wired source.

20. Multiple format secure voice apparatus and communication handset as claimed in claim 14 further including at least two different transceivers, each having a mating standard interface coupling attached thereto and designed to mate with the standard interface coupling of the core unit.

* * * * *